United States Patent
Dittmer et al.

(10) Patent No.: US 6,498,465 B1
(45) Date of Patent: Dec. 24, 2002

(54) DEVICE FOR GENERATING AN ADJUSTMENT SIGNAL FOR A D.C. CONVERTER

(75) Inventors: Bernd Dittmer, Ludwigsburg-Ossweil (DE); Roman Gronbach, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/787,162

(22) PCT Filed: Jul. 13, 2000

(86) PCT No.: PCT/DE00/02290

§ 371 (c)(1),
(2), (4) Date: Apr. 26, 2001

(87) PCT Pub. No.: WO01/06626

PCT Pub. Date: Jan. 25, 2001

(30) Foreign Application Priority Data

Jul. 15, 1999 (DE) .......................... 199 33 039

(51) Int. Cl.$^7$ ............................. G05F 1/40; G05F 1/44
(52) U.S. Cl. ....................... 323/266; 323/268; 323/284
(58) Field of Search ............................. 323/282, 222, 323/284, 266, 271, 268

(56) References Cited

U.S. PATENT DOCUMENTS

| | | | |
|---|---|---|---|
| 4,456,872 A | 6/1984 | Froeschle | 323/286 |
| 4,646,219 A * | 2/1987 | Rohl | 363/21.07 |
| 5,598,092 A | 1/1997 | Ohtsuka | 323/222 |
| 5,717,322 A | 2/1998 | Hawkes | 323/282 |
| 5,982,160 A * | 11/1999 | Walters et al. | 323/282 |
| 6,025,793 A * | 2/2000 | Kah | 341/155 |
| 6,058,030 A * | 5/2000 | Hawkes et al. | 363/65 |

FOREIGN PATENT DOCUMENTS

| | | | |
|---|---|---|---|
| DE | 41 27 577 A | 3/1993 | H02M/3/00 |
| EP | 0 664 596 A | 7/1995 | H02J/1/10 |
| EP | 0 759 653 A | 2/1997 | H02M/3/156 |
| WO | 95 09476 A | 4/1995 | H02M/3/335 |

OTHER PUBLICATIONS

Sancho J F: "Advatages and Features Using a Common . . . ", International Telecommunications Energy Conference. (INTELEC), US, New York, IEEE, BD. Conf 15, Sep. 27, 1993, pp. 3930397.

* cited by examiner

Primary Examiner—Bao Q. Vu
(74) Attorney, Agent, or Firm—Michael J. Striker

(57) ABSTRACT

The invention relates to a device for generating a regulating signal for a direct voltage converter. The device has a voltage regulator and a current regulator at whose output the regulating signal can be tapped. Between the voltage regulator and the current regulator, a limiter is provided, which serves to limit the output signal of the voltage regulator. The limiter has an input connection which can be used to supply it with a predeterminable limit value signal for the current reference value.

8 Claims, 5 Drawing Sheets

DEVICE FOR GENERATING AN ADJUSTMENT SIGNAL FOR A D.C. CONVERTER

The invention relates to a device for generating a regulating signal for a direct voltage converter, with the features disclosed in the preamble to claim 1.

PRIOR ART

Figure 1:
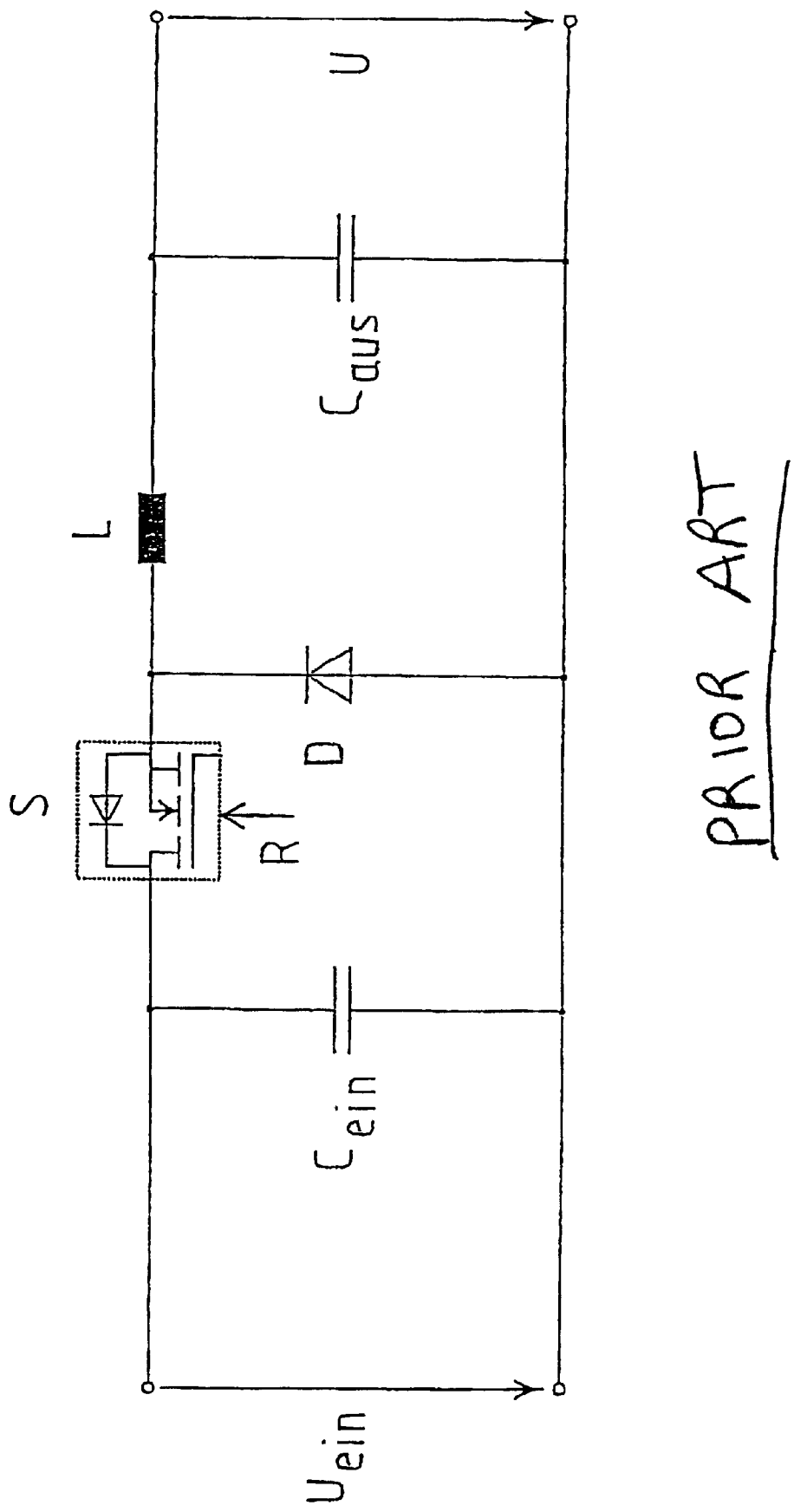

Direct voltage converters are used to convert electrical energy between different voltage levels. An exemplary embodiment for a direct voltage converter of this kind is shown in FIG. 1. The input voltage $U_{in}$ that is present at an input capacitor $C_{in}$ is converted by means of a step-down transformer into an output voltage U that can be tapped at an output capacitor $C_{out}$. This conversion takes place through the use of a series circuit comprised of a power switch S and a choke L, with the cathode of a diode D being connected between the power switch and the choke and the anode of this cathode being connected to a reference potential. The keying ratio of the power switch, which has a field effect transistor, is predetermined by means of a regulating signal R, which is determined through the use of the fed-back output voltage.

Figure 2:
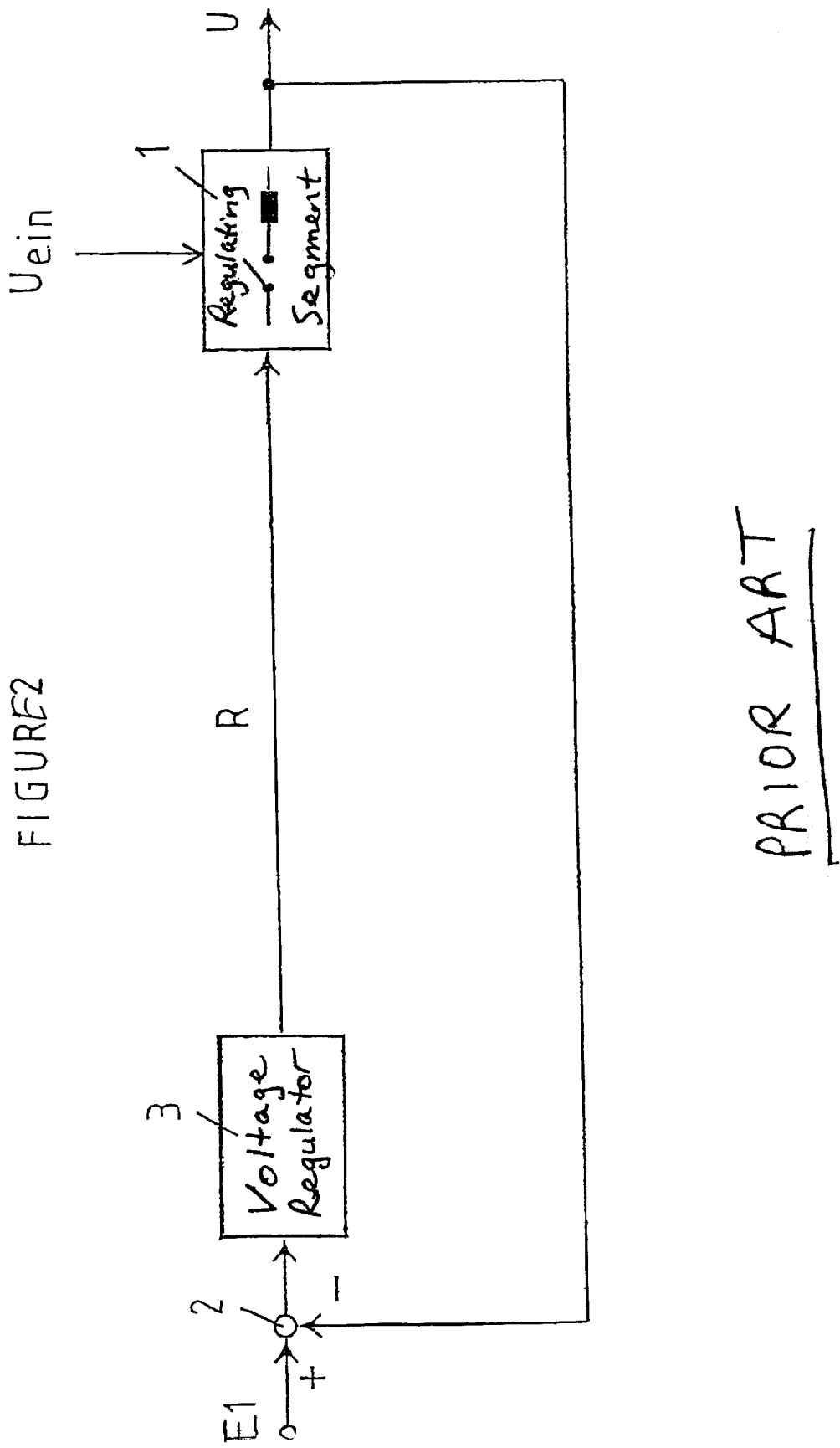

This is shown in FIG. 2, which depicts the associated regulating structure. The output voltage U that can be tapped at the output of the regulating segment 1 is fed back to the input side and in a subtracter 2, is subtracted from a voltage reference value that is present at an input E1. A voltage regulator 3 is connected to the output of the subtracter 2 and on the output side, produces the regulating signal. This indicates the keying ratio for the power switch associated with the regulating segment. This keying ratio can be used to adjust or regulate the average voltage present at the choke.

Figure 3:
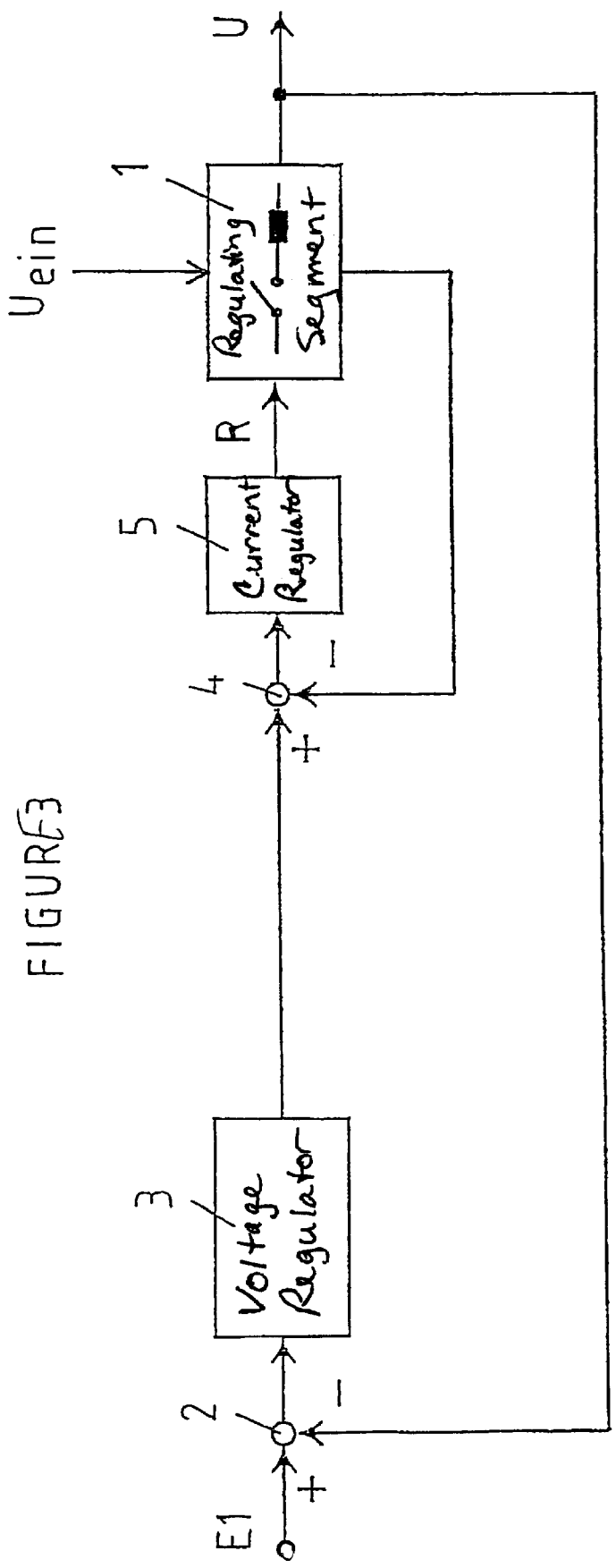

There is another known methodology for producing the above-mentioned regulating signal R by using a current control loop which is preceded by a voltage regulator. This is shown in FIG. 3, which depicts the associated regulating structure. The output voltage U that can be tapped at the output of the regulating segment 1 is fed back to the input side and in a subtracter 2, is subtracted from a voltage reference value that is present at an input E1. A voltage regulator 3 is connected to the output of the subtracter 2 and on the output side, produces a current reference value for a current control loop. A current actual value that corresponds to the choke current is fed back from the regulating segment 1 and is subtracted from the current reference value in a subtracter 4. The output signal of the subtracter 4 is supplied to a current regulator 5 which at its output, produces the regulating signal R for the regulating segment 1.

ADVANTAGES OF THE INVENTION

The device according to the invention for generating a regulating signal for a direct voltage converter, with all of the features disclosed in the preamble to claim 1, has the advantage that it alternatively permits a regulation of the output voltage or a regulation of the current. In addition, operation with output voltage regulation achieves an overload protection by means of limiting the output current.

These advantages are achieved by using a limiter for the current reference value, which is connected between the voltage regulator and the current regulator. This limiter advantageously operates in a variable manner and has an input connection which can be used to supply it with a limit value signal for the current reference value.

Advantageous embodiments and modifications of the invention are disclosed in the dependent claims.

DRAWINGS

Figure 4:
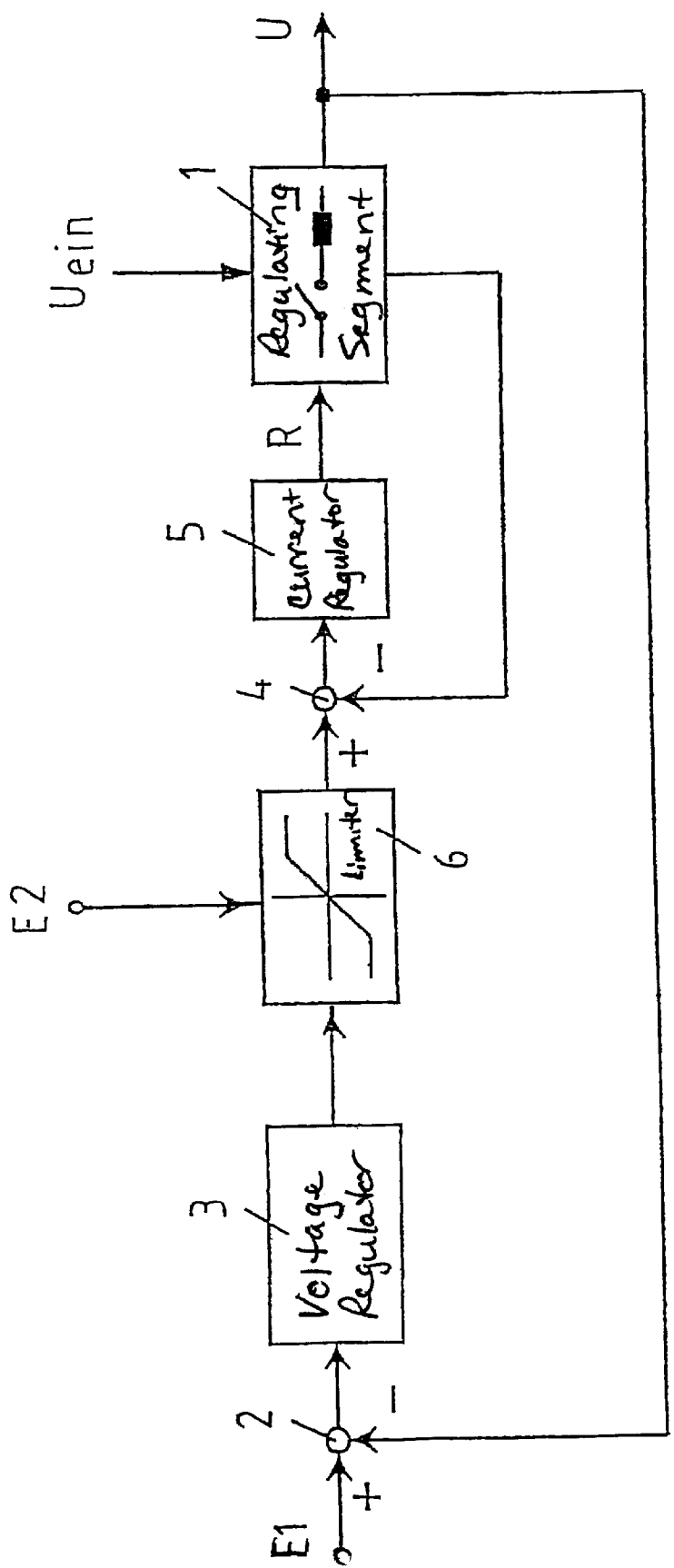
Figure 5:
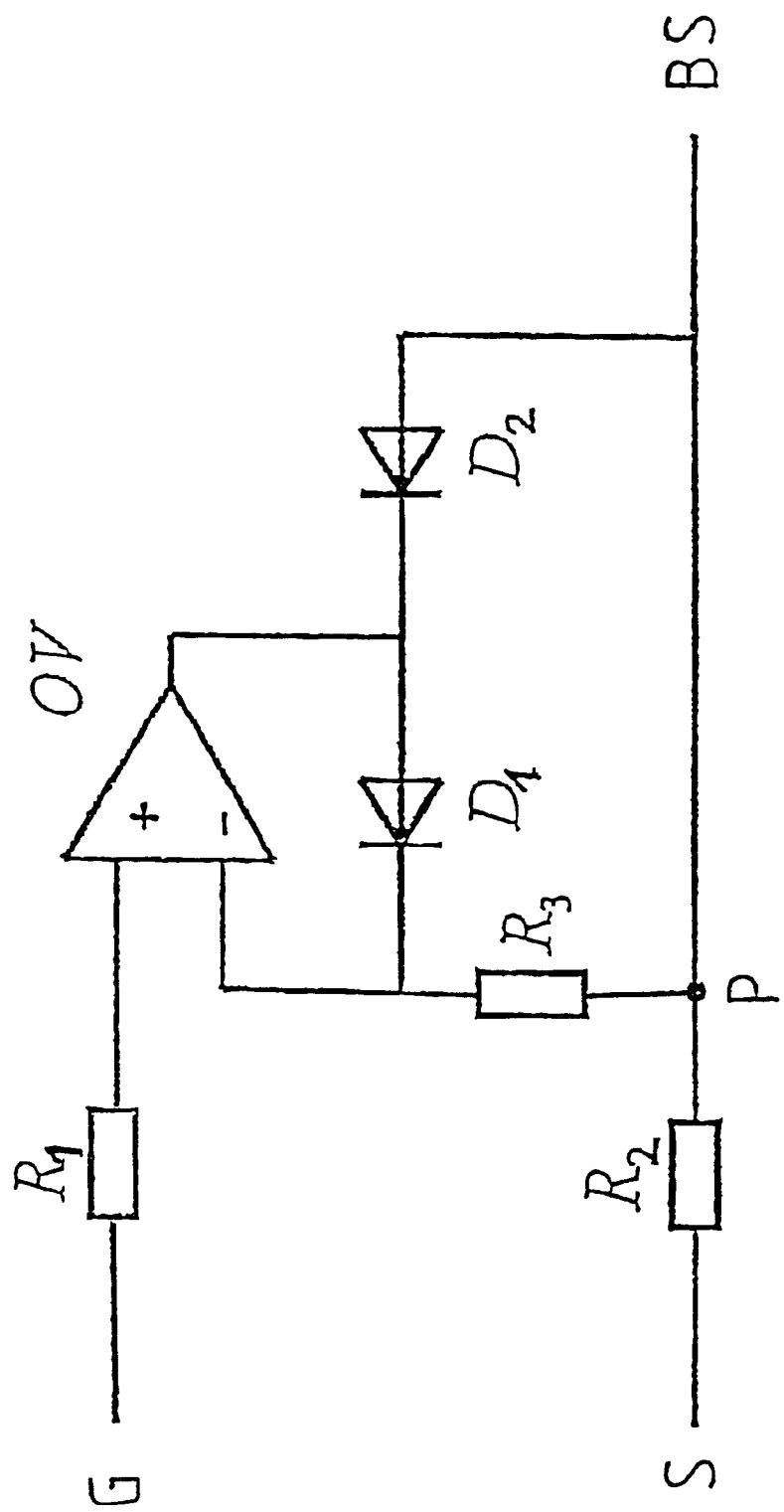

FIG. 1 shows an exemplary embodiment of a known direct voltage converter that can be used as a step-down transformer, FIG. 2 shows a first known device for producing a regulating signal for a direct voltage converter, FIG. 3 shows a second known device for producing a regulating signal for a direct voltage converter, FIG. 4 shows an exemplary embodiment for a device according to the invention for generating a regulating signal for a direct voltage converter, and FIG. 5 shows an exemplary embodiment of the limiter 6 from FIG. 4.

DESCRIPTION

FIG. 4 shows an exemplary embodiment for a device according to the invention for generating a regulating signal for a direct voltage converter.

The device shown is supplied via the input connection E1 with a voltage reference value that is generated in a microcomputer, not shown. This voltage reference value is transmitted to an input of a subtracter 2. The other input of the subtracter 2 is supplied with the output voltage U, with a negative sign, that is fed back from the output of the regulating segment 1 so that in the subtracter 2, the output voltage U is subtracted from the voltage reference value.

The differential signal obtained is supplied to a voltage regulator 3 which at its output, produces a current reference value that is a function of this differential signal. This current reference value is transmitted to a variable limiter 6. By means of an input connection E2, this variable limiter 6 is supplied with a limit value signal for the current reference value. The limit value signal for the current reference value is also generated by means of the above-mentioned microcomputer.

The limited current reference value signal present at the output of the limiter 6 is transmitted with a positive sign to a first input of a subtracter 4. The second input of this subtracter 4 is supplied with a current actual value signal that has a negative sign and is received from the regulating segment 1 so that in the subtracter 4, the current actual value signal is subtracted from the limited current reference value signal.

The differential signal obtained is supplied to a current regulator 5 which at its output, produces the regulating signal R for the regulating segment 1 and this regulating signal R predetermines the keying ratio for the power switch associated with the control loop 1.

Therefore, in order to produce the above-mentioned regulating signal R for the regulating segment 1, a regulating structure is used which has an overriding voltage regulator and a subordinate current regulator, in which the current reference values predetermined by the voltage regulator are conveyed through a limiter 6. This regulating structure makes it possible to achieve different operating modes by predetermining suitable values for the current reference value supplied to the input E1 and the limit value signal for the current reference value supplied to the input E2, as described below.

In a first operating mode with regulated output voltage, the voltage regulator sets the desired output voltage by predetermining the choke current reference value. The subordinate current regulator here produces control engineering advantages since the sequence of the current regulator can be reduced by one order of magnitude. If the current demand predetermined by the output signal of the voltage regulator exceeds the limit defined by the likewise predetermined limit value signal for the current reference value, then the voltage regulation operating mode is deactivated by the limiter in order to achieve an overload protection for the direct voltage converter. The current control loop also functioning then executes a regulation in which the predetermined limit value signal for the current reference value is supplied to the positive input of the subtracter. This corresponds to a regulation according to the predetermined limit value signal for the current reference value.

In order to produce an operating mode with a regulated output current, the input E1 is supplied to with a higher voltage reference value so that the voltage regulator 3 is brought into the overmodulated state. This produces an increase in the current reference value produced at the output of the voltage regulator 3 to the maximal value defined by the circuit engineering. The intervention possibility of supplying the device shown with a current reference value via the input E2 now makes it possible to predetermine a desired current reference value in order to produce a pure current regulation operating mode.

The excessive voltage reference value can be simultaneously used to limit the maximal voltage at the output, up to which only the current regulator is active. When this voltage limit is exceeded, the current regulator is disconnected from the voltage regulator.

The pure current regulation operating mode can be used in particular for a parallel operation of a number of direct voltage converters. In this connection, an overriding direct voltage converter executes the voltage regulation and assigns the other converters only the reference value for the output current to be set. The subordinate converters consequently function as current sources.

FIG. 5 shows an exemplary embodiment of the limiter 6 from FIG. 4. The limiter shown has two input connections. The first of these input connections is supplied with the current reference value S that is received from the voltage regulator 3. The second input connection, which corresponds to the input connection E2 shown in FIG. 4, is supplied with the limit value signal G for the current reference value.

Via a first resistor $R_1$, limit value signal G is supplied to the positive input of a differential amplifier OV. The current reference value S travels via a second resistor $R_2$ and a third resistor $R_3$ to the negative input of the differential amplifier. The output of the differential amplifier is fed back via a first diode $D_1$ to the negative input of the differential amplifier.

In addition, the output of the differential amplifier is connected to the cathode of a second diode $D_2$, whose anode constitutes the output of the circuit, at which a limited current reference value BS is present. The anode of the second diode $D_2$ is also connected to the connecting point P between the second resistor $R_2$ and the third resistor $R_3$.

The advantage of such an embodiment of the limiter 6 lies in the fact that the time delay until the active limitation of the signal is slight. By means of the diode $D_1$ and the resistor $R_3$, the output of the operational amplifier is always only a few 100 mV above the voltage level of the current reference value. Since the current reference value is slightly distorted by the resistor $R_3$, its resistance value should be selected as significantly greater than the resistance value of $R_2$. The resistor $R_1$ serves merely to compensate for input currents of the operational amplifier.

A direct voltage converter according to the invention can nevertheless be operated in different operating modes, in particular in a voltage regulation operating mode with a maximal current limitation or in a pure current regulation operating mode, by presetting respectively suitable values for the voltage reference value and the limit of the current reference value.

What is claimed is:

1. A device for generating a regulating signal for a direct voltage converter, comprising:

a voltage regulator having a first input connection (E1) at which a voltage reference value is supplied; a current regulator at whose output the regulating signal can be tapped; a limiter (6) provided between the voltage regulator (3) and the current regulator (5), which serves to limit the output signal of the voltage regulator (3), wherein said output signal is delivered to the current regulator (5) and serves as a current reference value for the current regulator (5), wherein the limiter (6) has a second input connection (E2) for a signal which corresponds to a predeterminable limit value signal for the current reference value; and a microcomputer for generating the limit value signal for the current reference value.

2. The device according to claim 1 further comprising a regulating segment (E1) with a first input for an input value ($U_{in}$), a second input for the regulating signal (R), and an output for an output voltage (U); and a first subtracter (2), which is used to determine the difference between the voltage reference value and the output voltage, wherein the voltage regulator (2) is used to generate a current reference value and is connected to the output of the first subtracter (2), wherein a second subtracter (4) is provided, said second subtracter used to determine the difference between the current reference value and a current actual value received from the regulating segment (1), and wherein the current regulator (5) is connected to the second subtracter (4) and on it output side, produces the regulating signal (R) for the regulating segment (1).

3. The device according to claim 1, wherein the microcomputer generates the voltage reference value.

4. The device according to claim 3, wherein in order to produce a pure current regulation operating mode of the direct voltage converter, the microcomputer generates a voltage reference value that overmodulates the voltage regulator.

5. The device according to claim 4, further comprising a plurality of direct voltage converters disposed in parallel to one another.

6. The device according to claim 1, wherein the limiter (6) has an operational amplifier (OV) whose first input is supplied with the limit value signal (G), whose second input is supplied with the reference value signal (S) via a series circuit comprised of a second resistor ($R_2$) and a third resistor ($R_3$), whose output is connected via a first diode (D1) to the second input, and whose output is connected via a second diode (D2) to a tapping point (P) between the second and the third resistor, and that a limited reference value signal can be tapped at this tapping point (P).

7. The device according to claim 6, wherein the limit value signal is supplied to the first input of the operational amplifier via a first resistor ($R_1$), wherein said first resistor ($R_1$) is used to compensate for input currents.

8. The device according to claim 6, wherein the resistance value of the third resistor ($R_3$) is significantly greater than the resistance value of the second resistor ($R_2$).

* * * * *